(12) United States Patent
Shojaei et al.

(10) Patent No.: US 11,243,155 B2
(45) Date of Patent: Feb. 8, 2022

(54) GEL SHEAR STRENGTH MEASUREMENT USING A CROSS-SPRING PIVOT

(71) Applicant: Halliburton Energy Services, Inc., Houston, TX (US)

(72) Inventors: Amir Shojaei, Mountainview, CA (US); Dale E. Jamison, Humble, TX (US); Robert J. Murphy, Kingwood, TX (US); Sorin Gabriel Teodorescu, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 148 days.

(21) Appl. No.: 16/606,353

(22) PCT Filed: Jun. 15, 2017

(86) PCT No.: PCT/US2017/037728
§ 371 (c)(1),
(2) Date: Oct. 18, 2019

(87) PCT Pub. No.: WO2018/231237
PCT Pub. Date: Dec. 20, 2018

(65) Prior Publication Data
US 2021/0109001 A1   Apr. 15, 2021

(51) Int. Cl.
*G01N 11/14* (2006.01)
*G01N 11/16* (2006.01)

(52) U.S. Cl.
CPC .......... *G01N 11/14* (2013.01); *G01N 11/162* (2013.01)

(58) Field of Classification Search
CPC .................................................. G01N 11/14
USPC .......... 73/54.23, 54.28–54.35, 64.41–64.43, 73/54.02, 53.01, 841, 866
See application file for complete search history.

(56) References Cited

U.S. PATENT DOCUMENTS

| 8,653,321 B2 | 2/2014 | Lindner et al. |
| 2008/0236254 A1 | 10/2008 | Airey et al. |
| 2010/0274504 A1 | 10/2010 | Takahashi et al. |
| 2012/0325864 A1 | 12/2012 | Imaizumi et al. |

(Continued)

FOREIGN PATENT DOCUMENTS

| CN | 102072848 A | 5/2011 |
| CN | 104865157 A | 8/2015 |

(Continued)

OTHER PUBLICATIONS

International Search Report and Written Opinion issued in related PCT Application No. PCT/US2017/037728 dated Mar. 14, 2018, 17 pages.

(Continued)

*Primary Examiner* — Robert R Raevis
(74) *Attorney, Agent, or Firm* — Tenley Krueger; Baker Botts L.L.P.

(57) ABSTRACT

A rheometer apparatus and methods of use are provided. In one embodiment, the rheometer includes a sleeve having an interior space; a cylindrical bob disposed within the interior space of the sleeve and coupled to a first end of a bob shaft; a cross-spring pivot coupled to a second end of the bob shaft; an arm coupled to and projecting radially from the cylindrical bob; and a linear actuator coupled to the arm. In some embodiments, the rheometer apparatus may facilitate more accurate gel shear strength measurements and/or may be correlated with existing rheometer measurements.

20 Claims, 7 Drawing Sheets

(56) References Cited

U.S. PATENT DOCUMENTS

2013/0226473 A1 8/2013 Murphy et al.
2013/0298645 A1 11/2013 Raffer

FOREIGN PATENT DOCUMENTS

| CN | 106370348 A | 2/2017 |
| CN | 106774485 A | 5/2017 |
| WO | 2013/126179 A1 | 8/2013 |

OTHER PUBLICATIONS

Search Report issued in related Chinese Patent Application No. 2017800890325 completed Jul. 21, 2021, 3 pages.

GEL SHEAR STRENGTH MEASUREMENT USING A CROSS-SPRING PIVOT

CROSS-REFERENCE TO RELATED APPLICATION

The present application is a U.S. National Stage Application of International Application No. PCT/US2017/037728 filed Jun. 15, 2017, which is incorporated herein by reference in its entirety for all purposes.

BACKGROUND

The present disclosure relates generally to rheology measurements of fluids, and more particularly, to apparatuses and methods for measuring the gel shear strength of gelled fluids used in drilling fluids and other treatment fluids for use in subterranean formations.

Hydrocarbons, such as oil and gas, are commonly obtained from subterranean formations that may be located onshore or offshore. The development of subterranean operations and the processes involved in removing hydrocarbons from a subterranean formation are often complex. Typically, a wellbore may be formed by drilling a hole into a subterranean formation known or suspected to contain valuable hydrocarbons. These drilling operations are often carried out using complex drilling muds that may be gelled to create unique rheology profiles. Moreover, many fracturing methods and other wellbore treatment operations use a multitude of gelled and crosslinked fluids to perform specific tasks within the wellbore.

Thus, it is often useful in conjunction with these operations to determine the gel shear strength of a gelled fluid under a variety of conditions of temperature, pressure, atmosphere and the like to evaluate the performance of the fluid in the expected working environment in which the fluid will be employed. The liquids to be tested and/or the environment in which the tests are performed may be corrosive or at least harmful or deleterious to the testing equipment. For example, it may be desirable to determine the gel shear strength of drilling fluids under conditions simulating the actual borehole conditions to which the fluids will be subjected. It is not uncommon to encounter temperatures in excess of 400° F. (204.4° C.) and at pressures in excess of 10,000 psi (68,947.57 kPa) in deep well bore operations. Accordingly, in order to properly evaluate drilling fluids useful in deep drilling operations, it is desirable to obtain viscosity measurements conducted under these harsh conditions. In fact, it is desirable to conduct these tests under even more extreme conditions, e.g., at temperatures in excess of 700° F. (371.1° C.) and at pressures in excess of 20,000 psi (137,895.15 kPa). Further, it is often desirable to perform these tests in the presence of corrosive substances, e.g., hydrogen sulfide, and particulates that are often encountered in the drilling operation.

Apparatuses for measuring the gel shear strength of a fluid include conventional rheometers. These conventional rheometers generally include a cylindrical bob suspended within a concentric tubular sleeve for immersion in the fluid to be tested. These devices further include certain means for rotating the sleeve at a known velocity as well as certain means for measuring the angular deflection of the suspended bob as a controlled velocity is applied. In this controlled-rate mode, the shear stress on the bob at various angular velocities (or shear rates) may be used to determine a rheological signature of a fluid. Alternately, the peak shear stress exerted on the bob upon initial start-up of the sleeve may be used to indicate the gel shear strength of the fluid at a predetermined quiescent state. The bob and sleeve are typically suspended from a stationary frame, the bob being suspended by conventional ball or roller bearings. The condition and lubrication of these bearings is important to the proper functioning of conventional rheometers. It will be appreciated by those skilled in the art that the lubrication and condition of the suspension and bearing system may be needed to ensure precise and accurate measurement of the angular motion or torque imparted to the bob. These bearings suffer from many disadvantages, particularly when used in remote, corrosive or harmful environments. Conventional ball or roller bearings tend over time to become pitted or gummed up, resulting in inaccurate viscosity measurements and, eventually resulting in failure of the instrument. These problems are accelerated and accentuated in rheometers used to make accurate and precise gel shear strength measurements in remote, corrosive or harmful environments.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
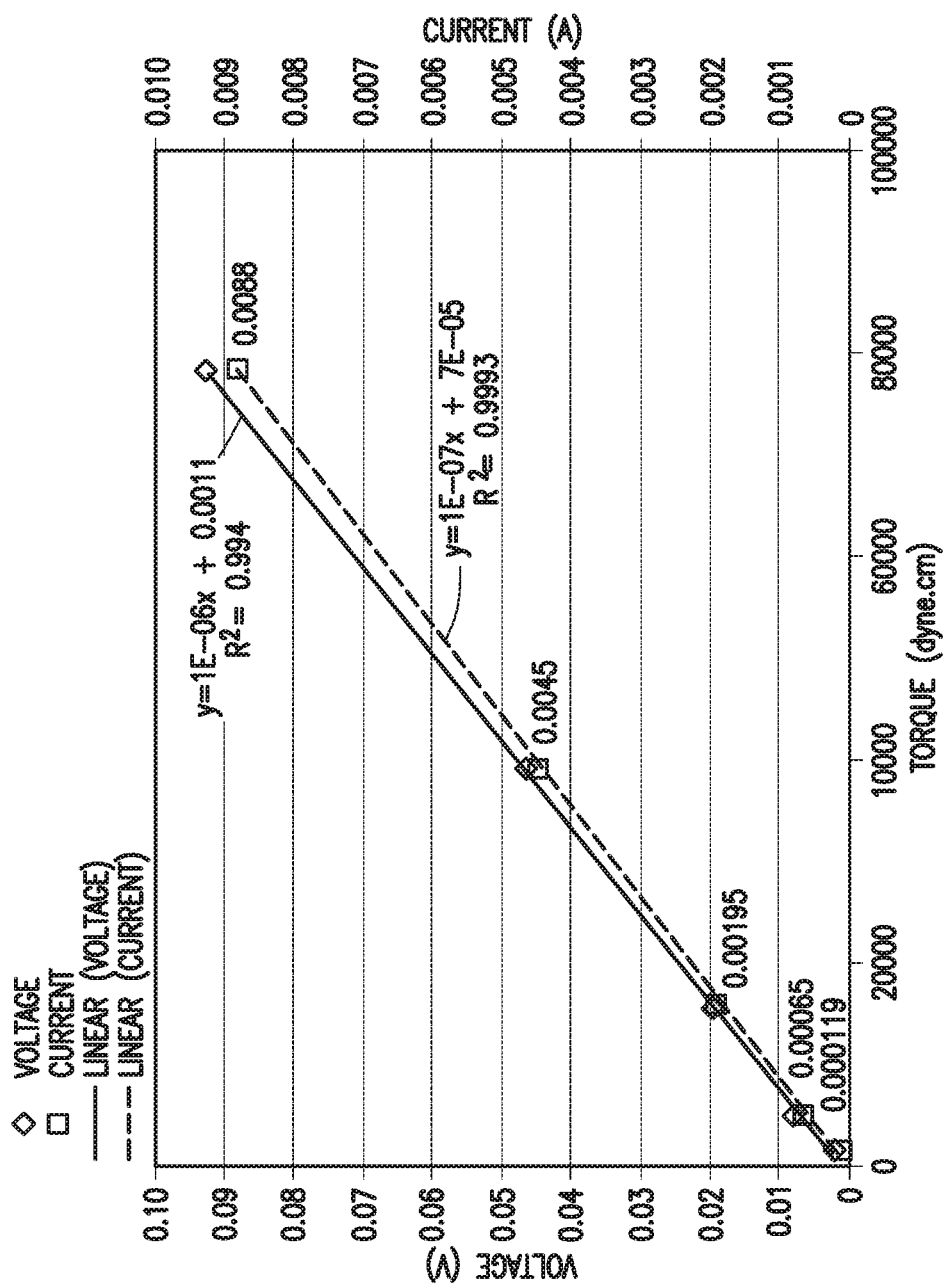
FIG. 1 is a graph illustrating data relating to torque calibration of a voice-coil actuator in accordance with certain embodiments of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates generally to rheology measurements of fluids, and more particularly, to apparatuses and methods for measuring the gel shear strength of gelled fluids such as drilling muds. In the present disclosure, the terms drilling mud and drilling fluid are used interchangeably and have the same meaning. As used herein, the term "gelled fluid" refers to fluid that forms a network of bonds (i.e., a gel microstructure) under either static or dynamic conditions. The strength of a gelled fluid relates, in part, to the corresponding gel microstructure, which is related to, inter alia, the intermolecular forces between the gelling agents (e.g., hydrogen bonding between polysaccharide molecules). However, the intermolecular forces can be relatively weak (e.g., as compared to ionic and covalent bonds). These relatively weak bonds may break when energy is put into the gel (e.g., by flowing or mixing the gel) and can reform over time as the energy input reduces or ceases. Therefore, a single gelled fluid may have a varying strength based on the history (e.g., the shear history) of the gelled fluid. Generally, a fluid is considered a gelled fluid for this description when the fluid exhibits the characteristics of a thixotropic fluid, a fluid where the stress response at a certain shear rate is time dependent, a fluid that exhibits stress when shear is initiated and that stress is time dependent, a fluid where when shear is initiated and continued at a specific shear rate the stress measured at that shear rate decreases over time, a fluid that when a shear force is stopped returns to a higher stress state over a fixed time, or a fluid that exhibits more than one of these characteristics.

In some embodiments, gelled fluids may comprise components capable of forming crosslinked networks. Suitable components capable of forming a crosslinked network may include, but are not limited to, polymers (crosslinked or non-crosslinked), surfactants (crosslinked or non-crosslinked), surfiners (crosslinked or non-crosslinked), chelating agents, weighting agents, colloidal particles, liquid crystals, and the like, or any combination thereof. Further, suitable components capable of forming a crosslinked network may include, but are not limited to, molecules and particles capable of interacting via hydrogen bonding, dipole-dipole interactions, London dispersion forces, pi-pi bonding, magnetic attraction, electronic attraction, and the like, or any combination thereof.

Nonlimiting examples of suitable components of gelled fluids may include precipitated barite, barite, submicron barite, hematite, ilmentite, manganese tetraoxide, galena, calcium carbonate, formation cuttings, clay particles, sugars, polysaccharides, biopolymers, derivatives polysaccharides and biopolymers that contain one or more monosaccharide units (galactose, mannose, glucoside, glucose, xylose, arabinose, fructose, glucuronic acid, or pyranosyl sulfate), synthetic polymers, organic carboxylated polymer, crosslinking agents, and the like, or any combination thereof. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethyl cellulose), xanthan, scleroglucan, succinoglycan, diutan, and combinations thereof.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacryl amidopropyldimethyl-n-octyl ammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the components of gelled fluids may comprise an acrylamide/2-(methacryloyloxy)ethyltrimethylammonium methyl sulfate copolymer. In certain embodiments, the components of gelled fluids may comprise a derivatized cellulose that comprises cellulose grafted with an allyl or a vinyl monomer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as components of gelled fluids.

Suitable crosslinking agents as components of gelled fluids may comprise a borate ion, a metal ion, or similar component that is capable of crosslinking at least two molecules of the gelling agent. Examples of suitable crosslinking agents as components of gelled fluids include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present disclosure, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to, the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

Suitable fluids for use in conjunction with the present disclosure that may be or comprise a gelled fluid may include, but are not limited to, treatment fluids, drilling fluids, drill-in fluids, insulating fluids, lost circulation fluids, stimulation fluids, sand control fluids, completion fluids, acidizing fluids, scale inhibiting fluids, water-blocking fluids, clay stabilizer fluids, fracturing fluids, frac-packing fluids, gravel packing fluids, wellbore strengthening fluids, sag control fluids, coal slurries, colloidal fluids, particle suspension fluids, food fluids (e.g., mustard and ketchup), personal care fluids (e.g., lotions, hair gels, toothpaste), inks, cements, adhesives, paints, waste streams (e.g., tailings suspension), and the like, or any hybrid thereof.

Gel shear strength can effect, inter alia, the magnitude of pressure increases exerted by the gelled fluid on the medium in which it is contained (e.g., a tubing, a pipe, a wellbore, a container, and the like) when flow is started. For example in a wellbore, some operations are often performed so as to maintain the wellbore pressure within the mud weight window, i.e., the area between the pore pressure and the fracture pressure of the subterranean formation. When the overbalance pressure exceeds the fracture pressure, a fracture may be induced and lost circulation may occur. Therefore, the gel shear strength can be a factor to take into account when performing equipment manipulations associated with a gelled fluid in a wellbore.

A rheometer apparatus may be used to determine the gel shear strength of a gelled fluid. Rheometer apparatuses generally include a bob assembly operably connected to a motor configured to rotate the bob assembly. Typically, the bob assemblies include a cylindrical bob suspended within a concentric tubular sleeve for immersion in the fluid to be tested. The bobs found in conventional rheometers are generally supported and rotated using conventional ball or roller bearings. When used in conjunction with gelled fluids and fluids with fine particulate matter, such as drilling fluids, the bearings can sometimes become clogged or wear down, and thus may become inoperable.

In contrast, the rheometer apparatuses of the present disclosure generally include a cross-spring pivot in the bob assembly. The cross-spring pivot does not require the use of conventional ball or roller bearings. Thus the cross-spring pivot reduces or eliminates the likelihood that particulate, gelled fluids, or other materials may become stuck in the assembly and wear down the pivot. Accordingly, the apparatuses and methods of the present disclosure are particularly well suited for use in the extreme and harsh environments that may be encountered at a drilling site or within a wellbore.

The bob assemblies of the present disclosure include a bob suspended at one end of a bob shaft. The other end of the bob shaft is attached to a cross-spring pivot. A commercial example of one cross-spring pivot that may be suitable for use in certain embodiments is available from C-Flex Bearing Co., Inc. Frankfort, N.Y. The cross spring pivot includes a stationary portion and a movable portion. A stand anchors the stationary portion, while the bob shaft is affixed to the movable portion. The movable portion is configured so that it rotates with the movement of the bob. An arm may be attached to the movable portion, projecting radially from a point on the cross-spring pivot. As will be discussed in further detail below, the arm may be used to measure the deflection of the bob.

The cross-spring pivot is generally constructed using two flexural strips. The flexural strips each generally comprise a flat piece of metal that is capable of bending sufficiently to create an angular deflection of the bob. These flexural strips may be constructed of any appropriate material having the necessary flexibility, elasticity and durability, e.g., spring steel, stainless steel, beryllium-copper alloys and the like. The flexural strips may be of any suitable shape, including but not limited to generally rectangular or elongated in shape. The flexural strips may be designed so that one flexural strip may fit through a hole in the other flexural strip. Accordingly, the first flexural strip may have a hole therein. The hole may comprise any configuration suitable for allowing the second flexural strip to pass through it. Thus the hole may be circular, rectangular, oval, or any other symmetrical or asymmetrical shape that is of sufficient size to permit the insertion of the second flexural strip and the orientation thereof to produce the desired axis or center of rotation for the bob assembly (as discussed below with reference to FIG. 1). The two flexural strips may comprise the same material or different material, and the strips and/or holes therein may have the same shape or different shapes. The flexural strips may be configured such that the first flexural strip and the second flexural strip are oriented at an angle of about 90° relative to each other. Alternatively, the flexural strips may be configured such that the first flexural strip and the second flexural strip are oriented at any angle relative to each other suitable to allow the bob assembly to properly rotate about the desired axis or center of rotation. The flexural strips may be configured such that the first flexural strip and the second flexural strip are oriented at an angle in the range of from about 45° to about 90°. The flexural strips also include one or more tabs near the ends of the flexural strips to facilitate the mounting of the strips to the bob assembly. The tabs may be integrally formed with flexural strips and may be made of the same material. Alternatively, the tabs may be formed separately and attached to the flexural strips, and may be made of the same material as or different material from the flexural strips. Unlike the rest of the flexural strips, the tabs may be deformed to further facilitate the mounting of the strips. The tabs may be attached to the to the stationary portion and to the movable portion of the bob assembly. The tabs may be attached using any means any suitable means, including, but not limited to, screws, adhesives, welding, solder, etc.

A cross-spring pivot constructed in this manner permits flexure of the movable portion relative to the stationary portion about the axis or center of rotation. The cross-spring pivot may be further designed such that the maximum degree of rotation about the axis or center of rotation is the degree of deflection that causes no permanent yielding of the flexural strips or a calibration shift. For example, when the angle of rotation is restricted to less than about two degrees (2°), the intersection of the flexural strips will not be appreciably shifted from the center of rotation and the spring may be employed in an accurate force or torque measuring device. Alternatively, the angle of rotation may be restricted to less than about three degrees (3°) or less than about (1°).

As discussed above, the rheometer apparatuses of the present disclosure include a bob assembly. The bob assembly comprises a bob suspended in the interior space of a sleeve. The sleeve may be of a size and shape configured to fully surround the bob, which may protect it from contact with other objects while used to perform measurements, and may be formed of any suitable material, including but not limited to stainless steel, hastelloy, or other high performance alloys. A main shaft and main shaft bearings may be coupled to the sleeve, and the shaft may be rotated to spin the sleeve while allowing the bob to stay suspended within the sleeve. The main shaft and main shaft bearings may be formed of any suitable material, including but not limited to stainless steel, hastelloy, or other high performance alloys. A motor (e.g., rotary motor) may be used to spin the sleeve, and a frame may be coupled to the main shaft or motor in order to support the sleeve in position surrounding the bob. As discussed above, an arm may be attached to the movable portion of a cross-spring pivot, projecting radially from a point on the cross-spring pivot. One or more brackets may support the stationary portion of the cross-spring pivot. The one or more brackets may be coupled to another structure in the assembly. For example, in some embodiments, the one or more brackets may be coupled to a structure, such a linear actuator, that may be installed on top of frame. As would be appreciated by one of ordinary skill in the art, the linear actuator is not required to be installed or located on top of the frame, and may be located or installed elsewhere in the assembly. In embodiments where the linear actuator is not located above frame, the one or more brackets may be coupled to a vertical portion of the frame. The linear actuator is coupled to the arm, and may be any actuator suitable to apply a linear force to the arm, thereby transferring rotational torque to the bob, including, but not limited to, a voice-coil actuator. The linear actuator may be used to apply a predefined load-controlled or deformation controlled loading to the bob via the arm. The rheometer apparatus may further include a digital encoder that is capable of measuring the angular deflection of the arm. As would be understood by one of ordinary skill in the art with the benefit of this disclosure, the digital encoder may be a component of linear actuator or it may be a standalone piece of equipment, and any known digital encoder device may be used.

As described above, in certain embodiments, the linear actuator may be a voice-coil actuator. When a voice-coil actuator is used, the torque applied by the voice-coil actuator at any given voltage or current may be calculated using commonly known dead weight calibration techniques. For other linear actuators, including pneumatic actuators and motor driven actuators, a person or ordinary skill in the art would know how to calculate the torque applied by the actuator. Referring now to FIG. 1, an example torque calibration graph is shown in which torque is calculated for a voice-coil actuator using dead weight calibration techniques. The graph provides a plot of the voice-coil actuator voltage versus the torque applied and a plot of the voice-coil actuator versus torque applied. As would be appreciated by one of skill in the art with the benefit of this disclosure, any given torque calibration graph may only be suitable for a particular rheometer apparatus configuration. Changes in the overall design and individual equipment components may necessitate the generation of a new torque calibration graph for accurate results.

The apparatuses and methods of the present disclosure are generally suitable for measurement of the gel shear strength of a fluid. Gel shear strength measurements may be taken by placing the rheometer assembly of the present disclosure in an amount of the given fluid. The amount of the fluid may be sufficient to submerge and fully cover the bob of the rheometer assembly. A motor then may rotate the sleeve to shear the fluid for a predetermined amount of time. The motor may rotate the sleeve at any rate and for any time sufficient to agitate and stir the fluid. A person of ordinary skill in the art with the benefit of this disclosure would appreciate that certain procedures for gel shear strength measurements may shear the fluid at 600 rpm for a period of 10 minutes, although other rates and time periods may be used as well. For example, the rotary motor may rotate the sleeve in a range of from about $1\times10^{17}$ rpm to about 3000 rpm for a period of 1 second, 10 minutes, 30 minutes, 60 minutes, or 120 minutes. After the fluid has been sheared, the fluid may be allowed to rest during pre-defined relaxation time periods. The relaxation time periods allow the gel structure of the fluid, if any, to form. A person of ordinary skill in the art with the benefit of this disclosure would appreciate that certain procedures for gel shear strength measurements may use relaxation time periods of 10 seconds, 10 minutes, and/or 30 minutes in duration. At the end of each relaxation time period, the voice-coil actuator exerts a linear force on the arm of the rheometer apparatus. This linear force may cause the movable portion of the cross-spring pivot to rotate, thereby applying a rotational force on the bob.

As the voice-coil actuator applies rotational force to the bob, the gel structure of the fluid may inhibit the rotational movement of the bob. The gel shear strength of a given fluid may be measured by finding the gel break point. The gel break point may be defined as the torque at which a significant increase in rotational motion of the bob occurs. This may be determined by applying a steadily increasing amount of torque and measuring the angular deflection of the bob. To find this, the angular deflection of the arm may be measured, for example, using the digital encoder. This angular deflection value may be plotted against time to determine at what time the gel break point was reached. In some embodiments, a computer or other data processor may then calculate the amount of torque applied to the bob at that particular time. A more detailed description of how this calculation may be performed follows.

Many different types of rheometer devices have been used to determine a variety of data measurements relating to rheological properties of fluids, including gel shear strength measurements. These rheometer devices include, but are not limited to the Fann™ 35 and the RheoVADR™ rheometer. Therefore, in many applications of the present disclosure, a correlation between the values obtained using the standard procedures of these known devices and values obtained using the presently-disclosed apparatuses and methods may be needed. Thus, it may be useful to correlate the torque applied by the voice-coil actuator to the bob of the present disclosure to the torque that would be applied by a Fann™ 35 rheometer or other known device to produce a similar gel shear strength measurement. The torque applied by the voice-coil actuator ("$T_{vc}$") is shared between the torque required to flex the cross-spring ("$T_{cs}$") and the torque applied on the bob required to deform the gel ("$T_{gel}$") according to Equation (1):

$$T_{vc}=T_{cs}+T_{gel} \quad (1)$$

As would be appreciated by one of ordinary skill in the art having the benefit of this disclosure, $T_{gel}$ may be used to calculate the gel shear strength.

Figure 3:
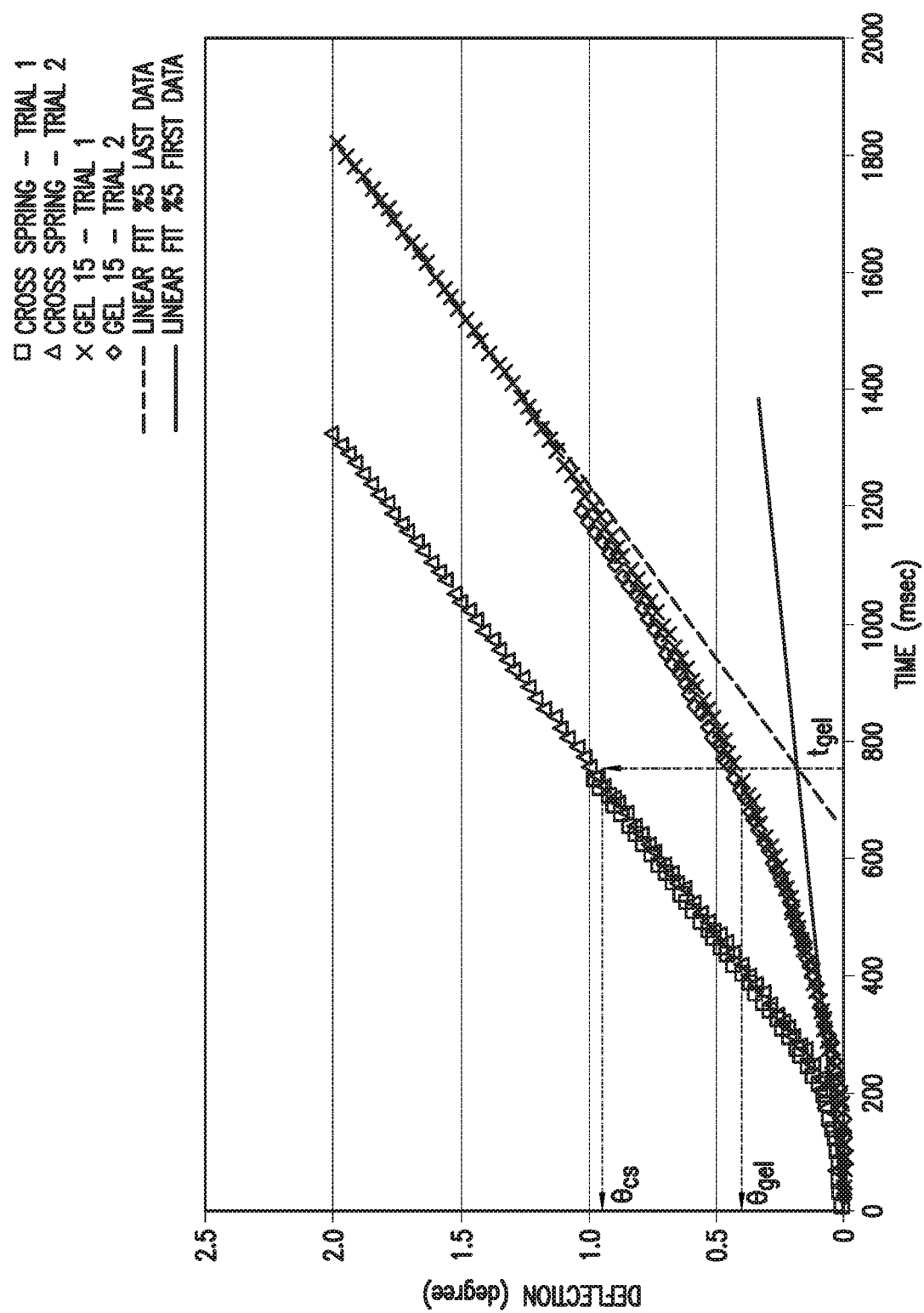
FIG. 3 is a graph illustrating data relating to angular deflection of a bob in accordance with certain embodiments of the present disclosure.

The cross-spring may follow a linear spring correlation according to Equation (2):

$$T_{cs}=K_{cs}\times\theta \quad (2)$$

where $K_{cs}$ (dyne*cm/deg) is the stiffness of the cross-spring and $\theta$ (degrees) is the angular deflection as measured by the digital encoder. The stiffness of the cross-spring may be calculated using commonly known dead weight calibration techniques. Referring now to FIG. 3, an example cross-spring stiffness calibration graph is shown. The graph provides a plot of the torque versus degree of angular deflection.

As would be appreciated by one of ordinary skill in the art with the benefit of this disclosure, a new cross-spring calibration graph may be generated for any different cross-spring configuration. Likewise, a new cross-spring stiffness calibration graph may be generated after a certain number of uses of the rheometer apparatus as the strength and flexibility of the cross-spring pivot may change as a result of repeated use. The stiffness, $K_{cs}$, may be calculated by measuring the slope of the linear plot. The amount of torque applied to the gel at any given time step may generally be calculated using Equation (3):

$$T_{gel}^{i}=T_{gel}^{i-1}+\Delta T_{gel} \qquad (3)$$

where i indicates time steps, $T_{gel}^{i-1}$ is the torque applied in the previous time step, and $\Delta T_{gel}$ is the additional torque applied in the current time step.

In order to properly correlate the torque applied by the voice-coil actuator with that applied by the Fann™ 35 rheometer, the value of the additional torque applied should match that for the Fann™ 35 rheometer. Using a conventional Fann™ 35 rheometer, the additional torque applied may be calculated using Equation (4):

$$\Delta T_{gel}=K_{F35}\times\dot{\theta} \qquad (4)$$

where $K_{F35}$ is the Fann™ 35 spring constant and $\dot{\theta}$ is the angular velocity (deg/sec). Assuming an initial torque value of 0 (i.e., $T_{gel}^{0}=0$) the torque to be applied by the voice-coil actuator at any given time may be calculated using Equation (5):

$$T_{vc}=K_{cs}\times\theta+K_{F35}\times\dot{\theta}\times t. \qquad (5)$$

In some embodiments, a computer software system may use this equation to calculate the torque necessary in real-time as a function of time and angular deflection as monitored by the digital encoder.

Figure 2:
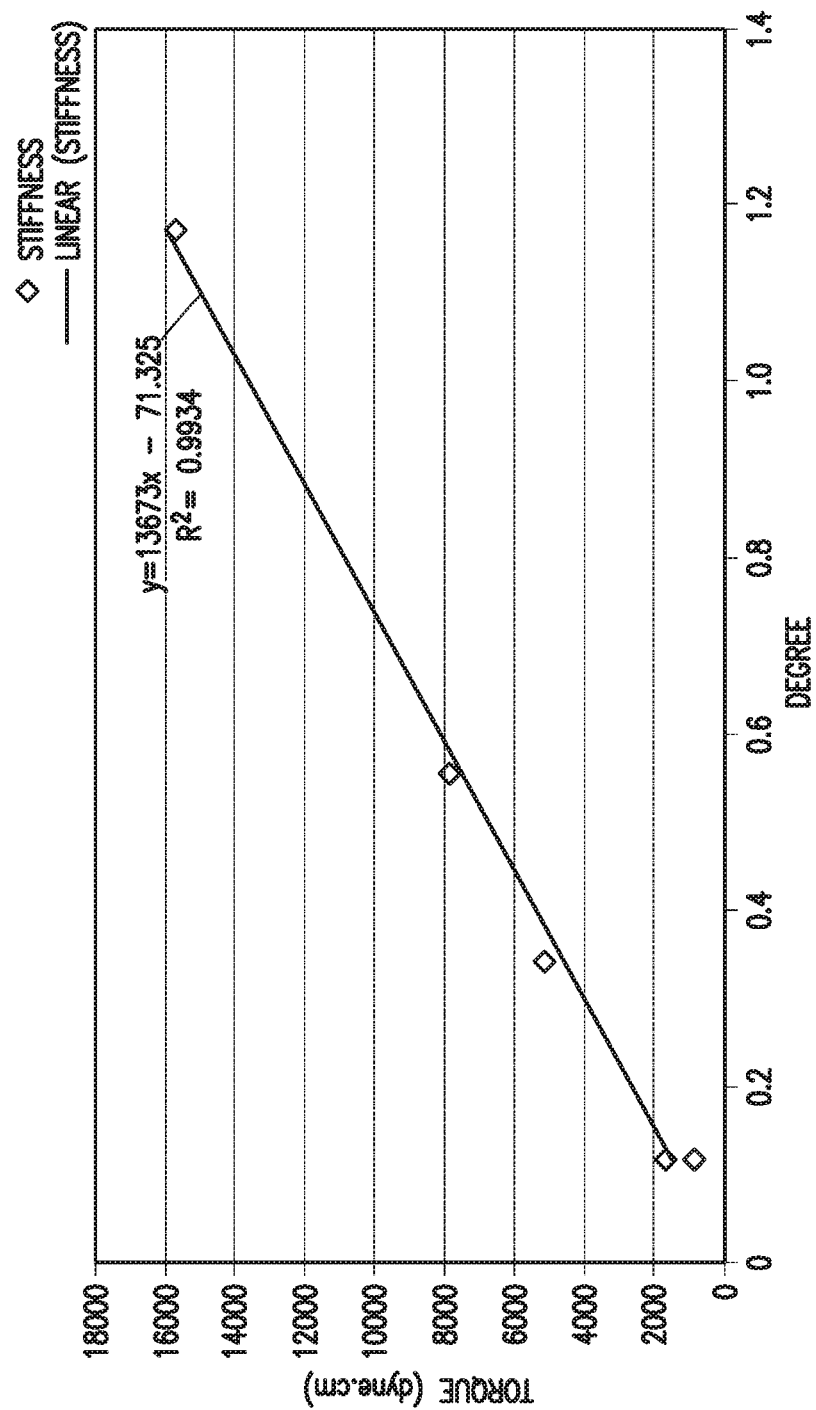
FIG. 2 is a graph illustrating data relating to cross-spring stiffness calibration in accordance with certain embodiments of the present disclosure.

As discussed above, the total torque applied by the voice-coil actuator ($T_{vc}$) is split between the torque required to flex the cross-spring ($T_{cs}$) and the torque applied on the bob required to deform and yield the gel ($T_{gel}$). Referring now to FIG. 2, a graph is provided showing deflection profiles with and without gelation effects. Two separate gel shear strength runs are performed to generate this graph. The first run is performed using the rheometer apparatus of the present disclosure with a gelled fluid, such as a drilling mud. The second run is performed using the rheometer apparatus of the present disclosure with no fluid. The second plot must be generated using the same torque rate equation as the first plot. Both plots depict the angular deflection of the bob as a function of time. Experimental observations show that the gel break point may be determined by using the first 5% of data of the first plot to fit a first line and the last 5% of data of the first plot to fit a second line. The intersection of the first and second lines occurs at the gel break point. The angular deflections both with gel effect ($\theta_{gel}$) and without gel effect ($\theta_{cs}$) may be read using the generated graph as shown in FIG. 3.

The angular deflection values may be used with a cross-spring stiffness calibration graph, such as the one depicted as FIG. 3, to determine the torque applied to the cross-spring at the time of the gel break point for both runs. For the second run, there is no gel effect, therefore for this particular run $T_{gel}=0$ and we are able to directly read the value for $T_{vc}$. Because the first and second runs used the same torque rate equation, the total voltage supplied by the voice-coil actuator for the first run and the second run are the same for a given elapsed time from starting the voltage ramp. For the first run, the torque required for angular deflection value $\theta_{gel}$ is equivalent to $T_{cs}$. It is now possible to calculate $T_{gel}$ by subtracting $T_{cs}$ from $T_{vc}$. The gel shear strength may then be obtained using Equation (6):

$$\tau_{gel}=\frac{T_{gel}}{\eta_{EF}\times A_{bob}\times r_{bob}} \qquad (6)$$

where $\tau_{gel}$ is the gel shear strength, $A_{bob}$ is the area of the bob, $r_{bob}$ is the radius of the bob, and $\eta_{EF}\cong1.05$. Table 1 provides a summary of sample test data comparing gel shear strength results obtained using the apparatuses and methods of the present disclosure and those obtained using a conventional Fann™ 35 rheometer.

TABLE 1

Summary of Test Results

| Test | # of Trials | Fann ™ 35 (lb/100 ft²) | Present Disclosure (lb/100 ft²) | % Diff. |
|---|---|---|---|---|
| OBM-API 10 Min Gel | 6 | 15.0-15.3 | 15.360-15.470 | 1.11-2.4 |
| OBM-API 10 Min Gel | 5 | 36.0-37.0 | 36.461-37.597 | 1.12-1.16 |

It may be advantageous to provide real-time measurement of a drilling fluid during wellbore drilling operation. Drilling operations may be carried out using a fluid such as a drilling mud. One of the main functions of drilling mud is to carry the cuttings produced by drill bit from the bottom of the well to the surface through the annular space of the wellbore. The drilling mud may be moved through the system using one or more drilling fluid pumps. Every time a drill pipe is added to the drill string, the fluid pump is stopped and circulation of the mud is also stopped. When the mud is stationary, the cuttings present in the annular space have a tendency to fall to the bottom of the well. In order to prevent such an inconvenience, a relatively viscous drilling fluid is used to maintain the cuttings in suspension when the fluid is stationery. However, the viscosity of the mud cannot be too great from the pumping means to circulate the mud effectively in the well. Moreover, the viscosity must be maintained throughout the starting and stopping of the pump, as well as the shear exerted on the fluid as it flows to the surface. Accordingly, it is often advantageous to monitor the gel shear strength of a fluid to know if it will properly meet these needs.

Figure 4:
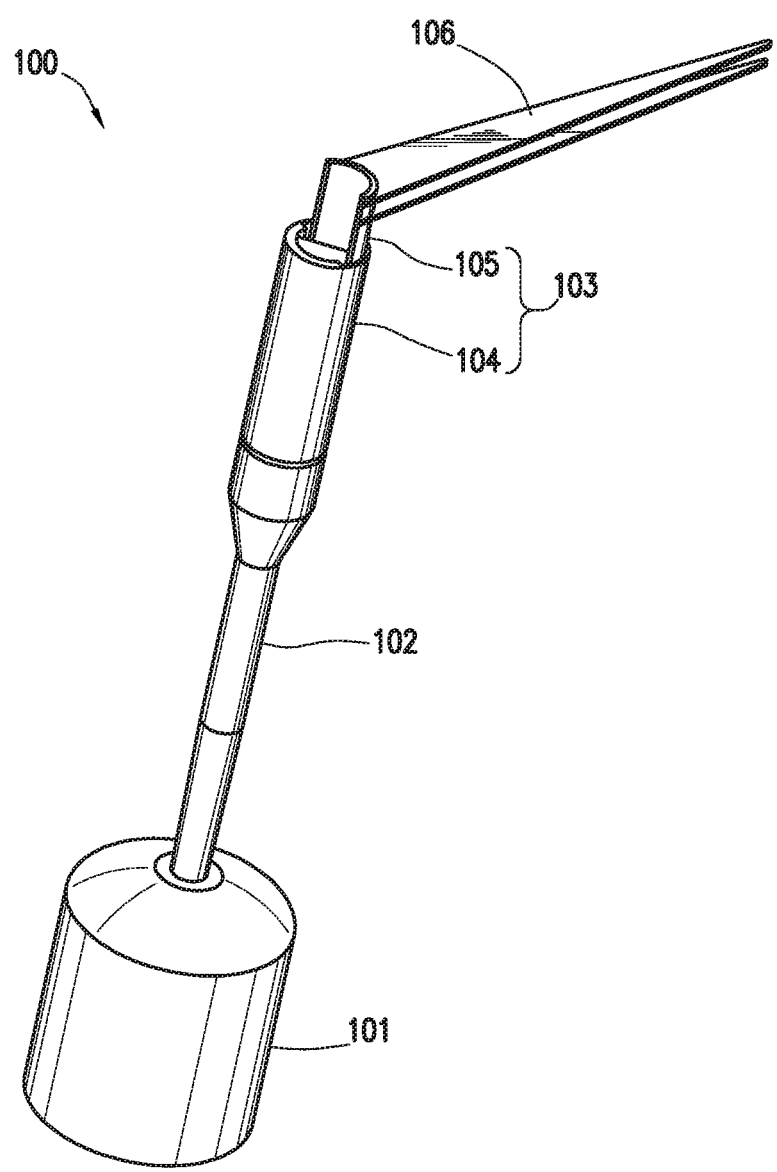
FIG. 4 is an isometric diagram illustrating a cross-spring pivot rheometer bob assembly in accordance with certain embodiments of the present disclosure.

FIG. 4 is an isometric view of a cross-spring pivot rheometer bob assembly 100 in accordance with embodiments of the present disclosure. Assembly 100 includes a bob 101 suspended at one end of a bob shaft 102. The other end of the bob shaft 102 is attached to a cross-spring pivot 103. The cross spring pivot 103 includes a stationary portion 104 and a movable portion 105. A stand (not shown) anchors the stationary portion 104, while the bob shaft 102 is affixed to the movable portion 105 that rotates with the movement of the bob 101. An arm 106 is attached to the movable portion 105, projecting radially from a point on the cross-spring pivot 103.

Figure 5:
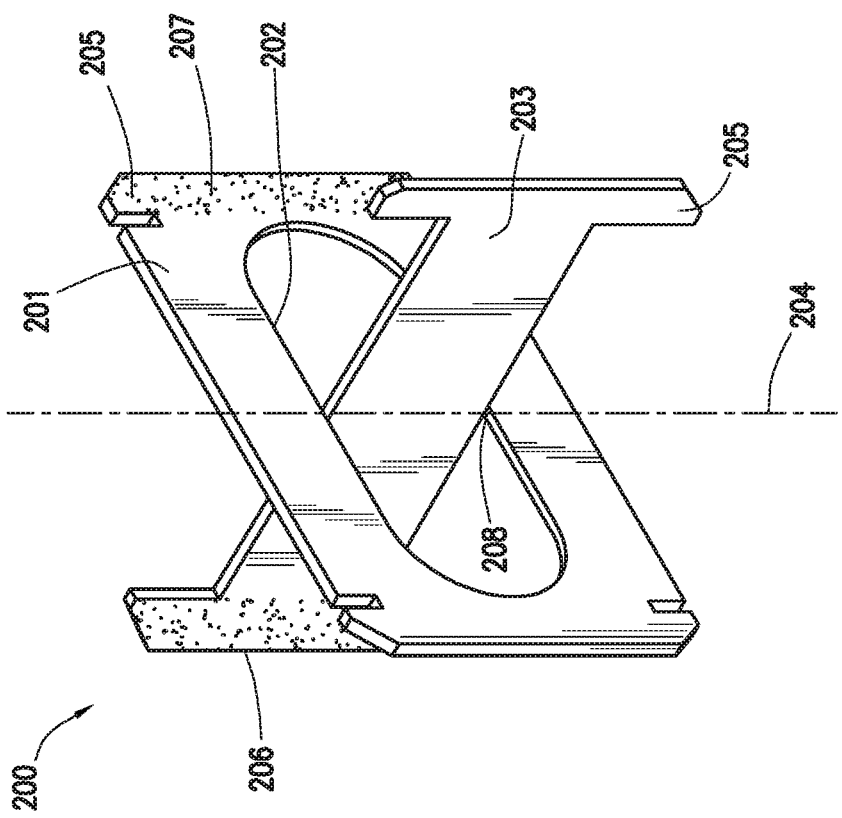
FIG. 5 is a schematic diagram illustrating a cross-spring pivot in accordance with certain embodiments of the present disclosure.

Referring to FIG. 5, an example configuration of the flexural strips used to form the cross-spring pivot internals 200 is illustrated. The first flexural strip 201 is a generally rectangular strip having a symmetrically located hole 202 of generally oval configuration therein. The hole 202 is of sufficient size to permit the insertion of the flexural strip 203 and the orientation thereof to produce the desired axis of center of rotation 204. Flexural strips 201 and 203 are shown such that flexural strip 201 and flexural strip 203 are oriented at an angle of 90° relative to each other. The flexural strips 201, 203 include tabs 205 near the ends thereof deformable to facilitate the mounting of the strips to the stationary portion 104 and to the movable portion 105 of the bob assembly (shown in FIG. 1). The cross-spring pivot as shown here permits flexure of the movable portion relative to the stationary portion about the axis or center of rotation 208.

Figure 6:
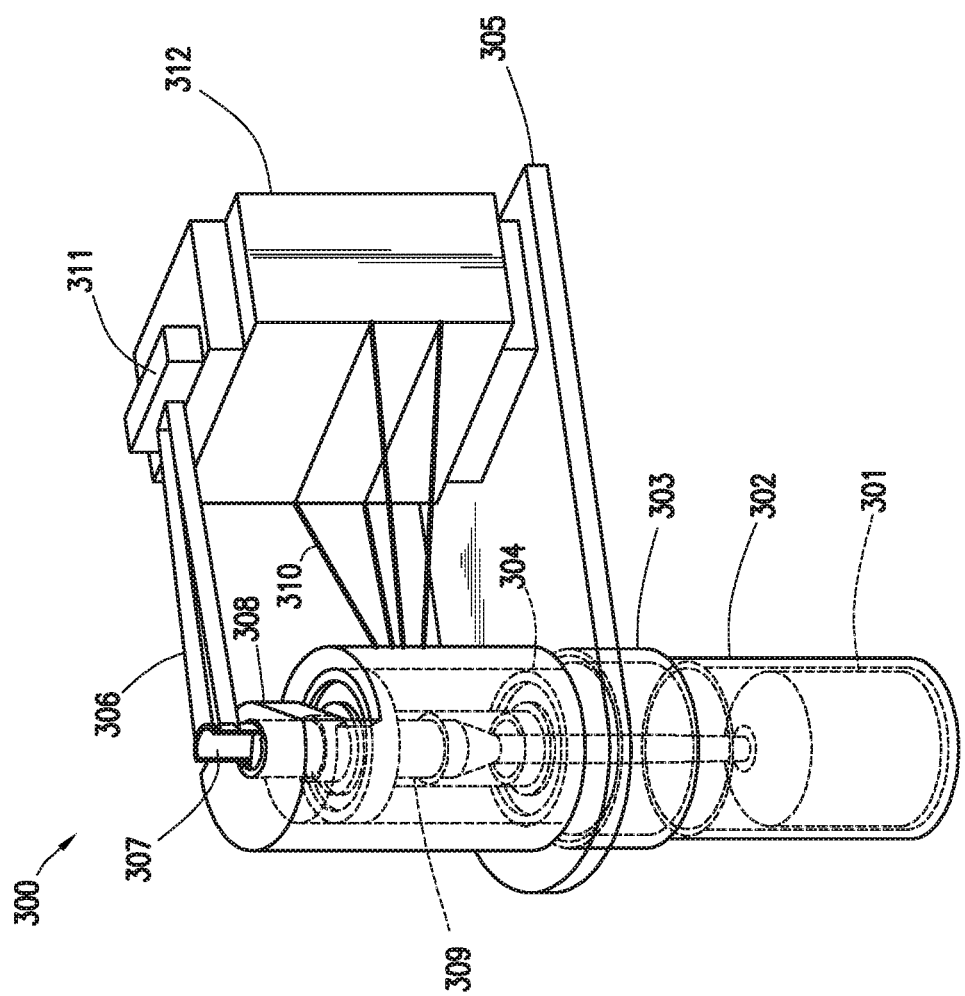
FIG. 6 is a partial schematic diagram illustrating a cross-spring pivot rheometer in accordance with certain embodiments of the present disclosure.

FIG. 6 shows a partial schematic of an illustrative rheometer assembly 300 of the present disclosure. Rheometer assembly 300 includes a bob 301 suspended in the interior space of a sleeve 302. A main shaft 303 and main shaft bearings 304 are shown as used to spin the sleeve 302 while allowing the bob 301 to stay suspended within the sleeve 302. A motor (not shown) may be used to spin sleeve 302. A frame 305 supports the sleeve assembly. As discussed above, an arm 306 is attached to the movable portion 307 of a cross-spring pivot 308, projecting radially from a point on the cross-spring pivot 308. The stationary portion 309 of the cross-spring pivot 308 is supported by one or more brackets 310. The one or more brackets 310 are coupled to a linear actuator 311 that is installed on top of frame 305. The linear actuator 311 is coupled to the arm 306. As shown, the linear actuator 311 may be used to apply a predefined load-controlled or deformation controlled loading to bob 301 via arm 306. Rheometer assembly 300 further includes a digital encoder 312 that is capable of measuring the angular deflection of arm 306.

In certain embodiments, a control system may be used to collect, process and display data regarding activities at the well site (either automatically via sensors at the well site or manually entered into the system), perform calculations using that data, as described above, and/or execute instructions to perform various functions at a well site. The control system may include an information handling system, such as a programmable logic controller or PLC, a suitably programmed computer, etc. Any suitable processing application software package may be used by the control system to process the data. In one embodiment, the software produces data that may be presented to the operation personnel in a variety of visual display presentations such as a display. In certain example system, the measured value set of parameters, the expected value set of parameters, or both may be displayed to the operator using the display. For example, the measured-value set of parameters may be juxtaposed to the expected-value set of parameters using the display, allowing the user to manually identify, characterize, or locate a downhole condition. The sets may be presented to the user in a graphical format (e.g., a chart) or in a textual format (e.g., a table of values). In another example system, the display may show warnings or other information to the operator when the central monitoring system detects a downhole condition. Suitable control systems and interfaces for use in the methods and systems of the present disclosure may include BARALOGIX™ provided by Halliburton Energy Services, Inc. Any suitable control system or interface may be used in keeping with the principles of this disclosure.

In certain embodiments, the control system may be communicatively coupled to an external communications interface. The external communications interface may permit the data from the control system to be remotely accessible (i.e., from a location other than the well site) by any remote information handling system communicatively coupled to the external communications interface via, for example, a satellite, a modem or wireless connections. In one embodiment, the external communications interface may include a router.

Figure 7:
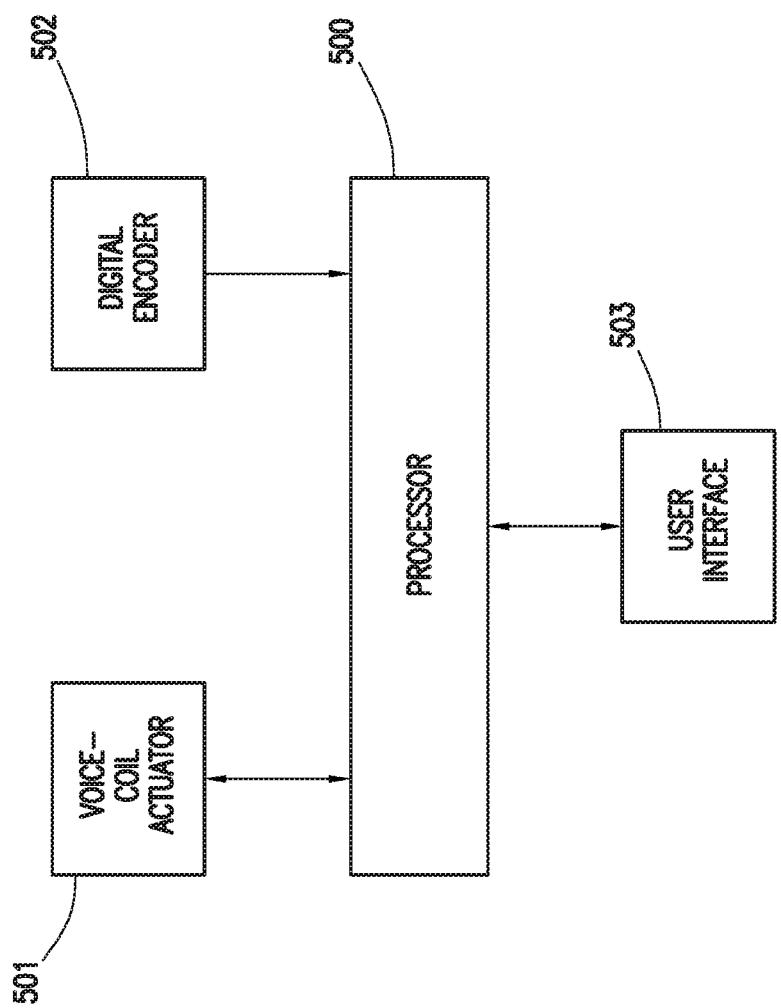
FIG. 7 is a block diagram illustrating certain control aspects useful with certain embodiments of the present disclosure.

Referring now to FIG. 7, a block diagram is shown illustrating certain control aspects useful with the apparatuses and methods of the present disclosure. In some embodiments, control of the apparatuses and methods of the present disclosure may be handled by processor 500. Processor 500 may be a data processor such as a computer processor or microprocessor. Voice-coil actuator 501 may be communicatively coupled to processor 500. Processor 500 may be configured to send information to and receive information from voice-coil actuator 501. This information may include, but is not limited to, command signals, voltage measurements, and current measurements. Digital encoder 502 may be communicatively coupled to processor 500. Processor 500 may receive position information and data from digital encoder 502 equating to the angular deflection of the bob (not shown). Processor 500 may be used to operate computer software and algorithms to calculate the equations discussed in further detail below. Processor 500 also may be communicatively coupled to a user interface 503 for reading information from and inputting information into processor 500. User interface 503 may be physically coupled to the rheometer apparatuses of the present disclosure, such as in the case of a keypad and small local display, or user interface 503 may be a remote computer system or interface.

An embodiment of the present disclosure is a rheometer apparatus that includes: a sleeve having an interior space; a cylindrical bob disposed within the interior space of the sleeve and coupled to a first end of a bob shaft; a cross-spring pivot coupled to a second end of the bob shaft; an arm coupled to and projecting radially from the cylindrical bob; and a linear actuator coupled to the arm.

In one or more embodiments described in the preceding paragraph, the cross-spring pivot further includes a stationary portion and a movable portion. In one or more embodiments described above, the linear actuator is a voice-coil actuator. In one or more embodiments described above, the voice-coil actuator further includes a digital encoder for measuring an angular deflection of the arm. In one or more embodiments described above, the rheometer apparatus further includes a processor communicatively coupled to the linear actuator. In one or more embodiments described above, the cross-spring pivot defines a center of rotation configured to rotate at least 2° without shifting.

Another embodiment of the present disclosure is a method that includes: placing a portion of a rheometer apparatus comprising a sleeve and a bob into a fluid, wherein the bob is supported by a cross-spring pivot; shearing the fluid by rotating the sleeve for a first period of time; allowing the fluid to rest for a second period of time after the step of shearing the fluid; applying a torque to the bob using a linear actuator to radially deflect the bob; measuring an angular deflection value of the bob in the fluid; and using the angular deflection value to determine a gel shear strength of the fluid.

In one or more embodiments described in the preceding paragraph, the step of applying a torque to the bob using a linear actuator further includes applying the torque using a voice-coil actuator. In one or more embodiments described above, the method further includes calibrating voice-coil actuator by plotting at least one of voltage and current versus torque as determined by dead weight calibration. In one or more embodiments described above, the step of applying a torque to the bob further includes calculating the torque as a function of a cross-spring stiffness constant, a traditional spring constant, the angular deflection of the bob, and time. In one or more embodiments described above, the step of using the angular deflection value to determine the gel shear strength further includes plotting a plurality of angular deflection values of the bob at different points in time versus time to form a shear torque plot; using the shear torque plot to determine the gel break point; and using the gel break point to calculate the gel shear strength. In one or more embodiments described above, the method further includes calibrating the cross-spring pivot by plotting torque applied versus angular deflection measured to determine the cross-spring stiffness. In one or more embodiments described above, shearing the fluid by rotating a sleeve includes rotating the sleeve at 600 rpm. In one or more embodiments described above, radially deflecting the bob further includes rotating the bob 2° or less. In one or more embodiments described above, measuring an angular deflection value of the bob further includes measuring the angular deflection value using a digital encoder. In one or more embodiments described above, the second period of time is selected from the group consisting of: 10 seconds, 10 minutes, 30 minutes, and any combination thereof. In one or more embodiments described above, the torque is shared by a first amount of torque applied to the cross-spring pivot and a second amount of torque applied to the fluid. In one or more embodiments described above, the fluid is a wellbore drilling fluid.

Another embodiment of the present disclosure is a method that includes: correlating a gel shear strength measurement of a fluid to a data point that corresponds to a gel shear strength of the fluid that would be observed using a Fann™ 35 rheometer, wherein the gel shear strength measurement is measured by: placing a portion of a rheometer apparatus comprising a sleeve and a bob into a fluid, wherein the bob is supported by a cross-spring pivot; shearing the fluid by rotating the sleeve for a first period of time; allowing the fluid to rest for a second period of time after the step of shearing the fluid; applying a torque to the bob using a linear actuator to radially deflect the bob; measuring an angular deflection value of the bob; and using the angular deflection value to determine the gel shear strength of the fluid.

In one or more embodiments described in the preceding paragraph, the linear actuator further includes a voice-coil actuator, and the step of correlating the gel shear strength measurement of the fluid to the data point further includes: calculating the torque using Equation (5), where $T_{vc}$ is the torque, $K_{cs}$ is a cross-spring stiffness constant, $\theta$ is an angular deflection measurement of the bob, $K_{F35}$ is the Fann™ 35 spring constant, $\dot{\theta}$ is the angular velocity of the Fann™ 35 device, and t is a time; determining a first portion of the torque applied to the cross-spring pivot ($T_{vc}$) using a cross-spring calibration graph and the angular deflection measurement of the bob; calculating a second portion of the torque applied to the gel ($T_{gel}$) using Equation (1); and calculating the gel-shear strength using Equation (6), where $T_{gel}$ is the gel shear strength, $A_{bob}$ is an area of the bob, $r_{bob}$ is a radius of the bob, and $\eta_{EF} \approx 1.05$.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A rheometer apparatus comprising:
    a sleeve having an interior space;
    a cylindrical bob disposed within the interior space of the sleeve and coupled to a first end of a bob shaft;
    a cross-spring pivot coupled to a second end of the bob shaft;
    an arm coupled to and projecting radially from the cylindrical bob; and
    a linear actuator coupled to the arm.

2. The rheometer apparatus of claim 1, wherein the cross-spring pivot further comprises a stationary portion and a movable portion.

3. The rheometer apparatus of claim 1, wherein the linear actuator is a voice-coil actuator.

4. The rheometer apparatus of claim 3 further comprising a digital encoder for measuring an angular deflection of the arm.

5. The rheometer apparatus of claim 1, further comprising a processor communicatively coupled to the linear actuator.

6. The rheometer apparatus of claim 1, wherein the cross-spring pivot defines a center of rotation configured to rotate at least 2° without shifting the center of rotation.

7. A method comprising:
    placing a portion of a rheometer apparatus comprising a sleeve and a bob into a fluid, wherein the bob is supported by a cross-spring pivot;
    shearing the fluid by rotating the sleeve for a first period of time;
    allowing the fluid to rest for a second period of time after the step of shearing the fluid;
    applying a torque to the bob using a linear actuator to radially deflect the bob;
    measuring an angular deflection value of the bob in the fluid; and
    using the angular deflection value to determine a gel shear strength of the fluid.

8. The method of claim 7, wherein applying a torque to the bob using a linear actuator further comprises applying the torque using a voice-coil actuator.

9. The method of claim 8, further comprising calibrating voice-coil actuator by plotting at least one of voltage and current versus torque as determined by dead weight calibration.

10. The method of claim 7, wherein applying a torque to the bob further comprises calculating the torque as a function of a cross-spring stiffness constant, a traditional spring constant, the angular deflection of the bob, and time.

11. The method of claim 7, wherein using the angular deflection value to determine the gel shear strength comprises:
    plotting a plurality of angular deflection values of the bob at different points in time versus time to form a shear torque plot;
    using the shear torque plot to determine the gel break point; and
    using the gel break point to calculate the gel shear strength.

12. The method of claim 7, further comprising calibrating the cross-spring pivot by plotting torque applied versus angular deflection measured to determine the cross-spring stiffness.

13. The method of claim 7, wherein shearing the fluid by rotating a sleeve comprises rotating the sleeve at 600 rpm.

14. The method of claim 7, wherein radially deflecting the bob further comprises rotating the bob 2° or less.

15. The method of claim 7, wherein measuring an angular deflection value of the bob further comprises measuring the angular deflection value using a digital encoder.

16. The method of claim 7, wherein the second period of time is selected from the group consisting of: 10 seconds, 10 minutes, and 30 minutes.

17. The method of claim 7, wherein the torque comprises a first amount of torque applied to the cross-spring pivot and a second amount of torque applied to the fluid.

18. The method of claim 7, wherein the fluid is a wellbore drilling fluid.

19. A method comprising:
   correlating a gel shear strength measurement of a fluid to a data point that corresponds to a gel shear strength of the fluid that would be observed using a rheometer, wherein the gel shear strength measurement is measured by:
      placing a portion of a rheometer apparatus comprising a sleeve and a bob into a fluid, wherein the bob is supported by a cross-spring pivot;
      shearing the fluid by rotating the sleeve for a first period of time;
      allowing the fluid to rest for a second period of time after the step of shearing the fluid;
      applying a torque to the bob using a linear actuator to radially deflect the bob;
      measuring an angular deflection value of the bob; and
      using the angular deflection value to determine the gel shear strength of the fluid.

20. The method of claim 19, wherein
the linear actuator further comprises a voice-coil actuator, and
correlating the gel shear strength measurement of the fluid to the data point further comprises:
   calculating the torque using the following equation:

$$T_{vc} = K_{cs} \times \theta + K_{F35} \times \dot{\theta} \times t,$$

where $T_{vc}$ is the torque, $K_{cs}$ is a cross-spring stiffness constant, $\theta$ is an angular deflection measurement of the bob, $K_{F35}$ is the spring constant, $\dot{\theta}$ is the angular velocity of the rheometer, and t is a time;
   determining a first portion of the torque applied to the cross-spring pivot ($T_{vc}$) using a cross-spring calibration graph and the angular deflection measurement of the bob;
   calculating a second portion of the torque applied to the gel ($T_{gel}$) using the following equation:

$$T_{vc} = T_{cs} + T_{gel}; \text{ and}$$

calculating the gel-shear strength using the following equation:

$$\tau_{gel} = \frac{T_{gel}}{\eta_{EF} \times A_{bob} \times r_{bob}},$$

where $T_{cs}$ is the torque required to flex the cross-spring pivot, $\tau_{gel}$ is the gel shear strength, $A_{bob}$ is an area of the bob, $r_{bob}$ is a radius of the bob, and $\eta_{EF} \cong 1.05$.

* * * * *